United States Patent [19]

Danilenko et al.

[11] Patent Number: 4,736,292
[45] Date of Patent: Apr. 5, 1988

[54] ELECTRONIC DATA PROCESSING SYSTEM OVERLAID JUMP MECHANISM

[75] Inventors: Michael Danilenko, St. Paul; Larry L. Byers, Apple Valley; Louis B. Bushard, Andover, all of Minn.

[73] Assignee: Unisys Corporation, Blue Bell, Pa.

[21] Appl. No.: 809,681

[22] Filed: Dec. 16, 1985

[51] Int. Cl.⁴ .............................................. G06F 9/22
[52] U.S. Cl. .................................................. 364/200
[58] Field of Search ... 364/200 MS File, 900 MS File; 371/37

[56] References Cited

U.S. PATENT DOCUMENTS

| | | | |
|---|---|---|---|
| 4,115,853 | 9/1978 | Dummermuth | 364/200 |
| 4,145,736 | 3/1979 | Yamada et al. | 364/200 |
| 4,156,900 | 5/1979 | Gruno et al. | 364/200 |
| 4,245,302 | 1/1981 | Amdahl | 364/200 |
| 4,247,893 | 1/1981 | Anderson et al. | 364/200 |
| 4,451,884 | 5/1984 | Heath et al. | 364/200 |
| 4,667,290 | 5/1987 | Goss et al. | 364/300 |
| 4,691,279 | 9/1987 | Danilenko et al. | 364/200 |

Primary Examiner—Gary V. Harkcom
Assistant Examiner—Randy W. Lacasse
Attorney, Agent, or Firm—Charles A. Johnson; Lawrence J. Marhoefer

[57] ABSTRACT

A series of instructions N, N+1, N+2, etc. are issued by an instruction buffer 14 at a fixed clock rate in a pipelined method to parallel instruction flow path 6 and control word flow path 8, each path including a serial coupled holding register 20, 21, an instruction register 18, 19 and a function register 16, 17. If instruction N is a jump instruction, it and the related control word, when stored in the function registers 16, 17 causes the jump target instruction and the related control word of the jump instruction N to be entered into the holding register 20, 21. If the jump instruction N jump conditions are satisfied, the jump target instruction and related control word are written into the instruction registers 18, 19 and then into the function registers 16, 17 to be executed by the associated system.

6 Claims, 4 Drawing Sheets

INSTRUCTION FLOW

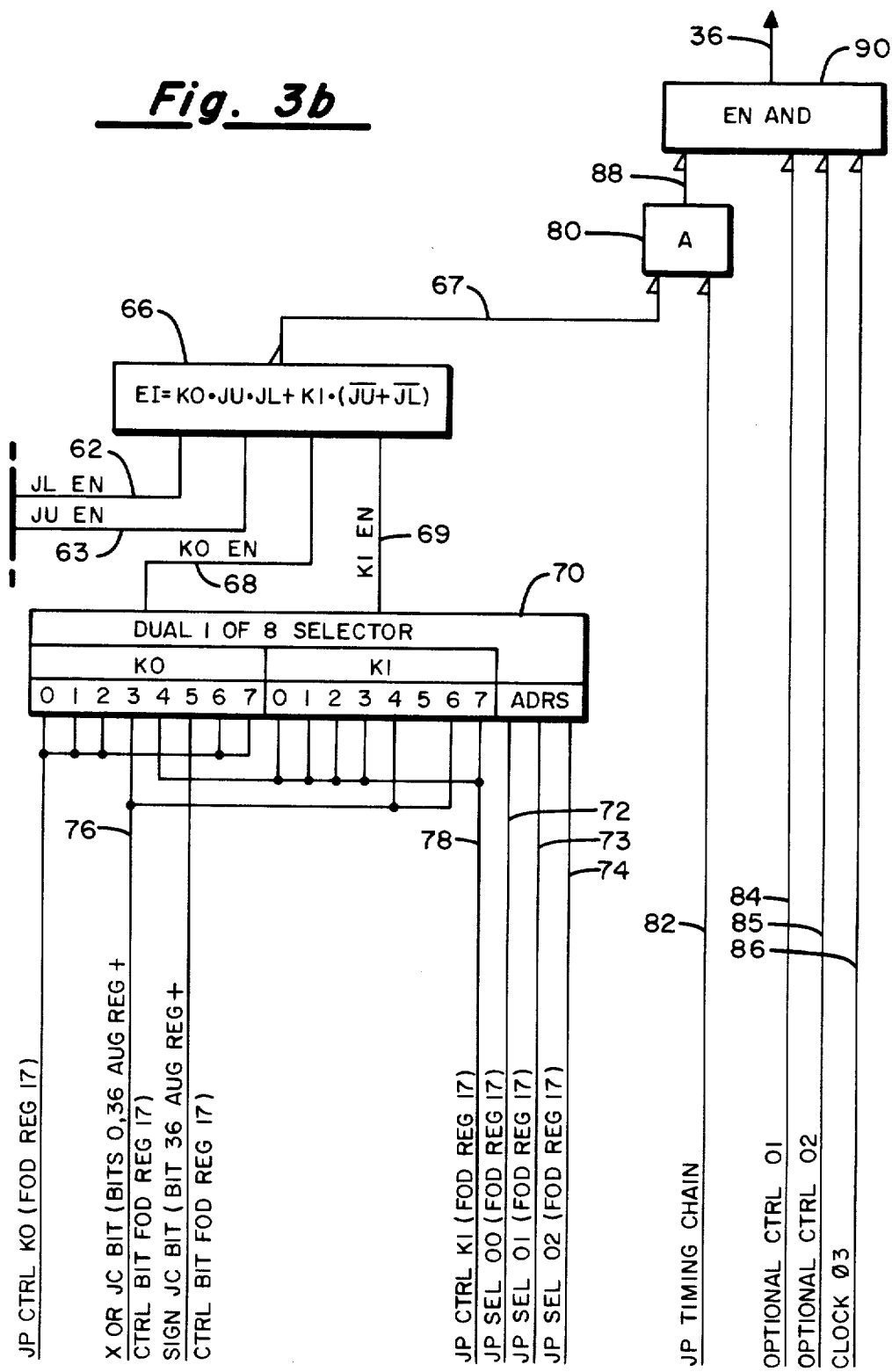

ELECTRONIC DATA PROCESSING SYSTEM OVERLAID JUMP MECHANISM

RELATED PATENT APPLICATIONS

The following copending patent applications are assigned to the Sperry Corporation, the assignee of this patent application, and the teachings therein are incorporated herein by reference:
Title: A Scientific Vector Processor
Inventor: Louis B. Bushard, et al
Ser. No. 696,130, now U.S. Pat. No. 4,680,775
Filing Date: July 29, 1985.
Title: An Improved Instruction Buffer For A Digital Data Processing System
Inventors: Michael Danilenko, et al.
Ser. No. 585,708, now U.S. Pat. No. 4,691,279
Filing Date: Mar. 2, 1984.

BACKGROUND OF THE INVENTION

1. Field of the Invention

The present invention relates to the field of electronic data processing systems and in particular to such a system that includes a digital scientific processor and related program instructions that include a jump instruction.

2. Description of the Prior Art

In the prior art it is known to store instructions in the instruction buffer of an electronic data processing system. The instruction buffer is addressed to cause an instruction N to be provided therefrom, which instruction N is passed into an instruction register and then into a function register. From the function register instruction N issues corresponding control signals to the system. It is also known that successive instructions N, N+1, N+2, etc. are successively addressed and passed from the instruction buffer in a serial manner through the same logic path into the instruction register and thence into the function register to provide corresponding control signals to the system. It is also known that if the instruction N is a jump instruction, an instruction controller causes the jump target instruction of the instruction N to be loaded into a jump target instruction register, which jump target instruction register is in logic parallel with the next instruction register. A selector circuit, which is intermediate the next instruction register and jump target instruction register and the instruction controller, is enabled such that if the jump criteria are not met, the selector circuit couples the instruction N+1 to the function register while, alternatively, if the jump criteria are met the selector circuit couples the jump target instruction to the function register.

Because the parallel coupled next instruction register and jump target instruction register and the associated selector circuitry require a large amount of space, as by requiring additional printed circuit card assemblies, it is desirable to eliminate the jump target instruction register and the selector circuit. The present invention is directed toward a scheme for providing a serial instruction flow with reduced space requirements and with no loss in performance.

SUMMARY OF THE INVENTION

In the present invention, a series of instruction addresses is coupled, at a fixed clock rate, to an instruction buffer which is caused to provide a series of corresponding instructions N, N+1, N+2, etc. at the fixed clock rate. The instructions are, in turn, coupled, in a pipeline fashion, to two parallel flow paths, an instruction flow path and a control word flow path. The related instructions and control words flow, in parallel, through their respective paths at the fixed clock rate such that the instructions and the control words, for instructions N, N+1 and N+2, are in their respective flow paths and are normally temporarily held in respectively associated function registers, instruction registers and holding registers.

If instruction N is a jump instruction, its transfer from the function register, causes the instruction buffer to provide the jump target instruction specified by instruction N, is instruction Y, while the instruction flow is halted to permit the instruction Y, i.e., the jump target instruction, instruction and related control word to be loaded into and written, or laid, over the instruction N+2 respective instruction and control word held in their respective holding registers. The halting of the instruction flow holds the instructions and related control words in their respectively associated function registers and instruction registers while jump decision circuitry determines if the jump criteria have or have not been satisfied. If the jump criteria are satisfied, the jump target instruction and related control word are loaded into and written, or laid, over the instruction N+1 instruction and control word held in their respective instruction registers. If the jump criteria are not satisfied, the status of the instruction registers is not altered. The instruction flow is again activated at the fixed clock rate to alternatively couple the jump target instruction of the instruction N, or the instruction N+1 instruction and related control word to their respectively associated function registers to be executed by the associated system.

BRIEF DESCRIPTION OF THE DRAWINGS

FIG. 1 is an illustration of a block diagram of the instruction flow of the instructions and control words of the scientific processor system into which the present invention is incorporated.

FIGS. 3, 3a and 3b are an illustration of the jump decision array incorporated in the system of FIG. 1.

DESCRIPTION OF THE PREFERRED EMBODIMENT

Figures 1, 3:
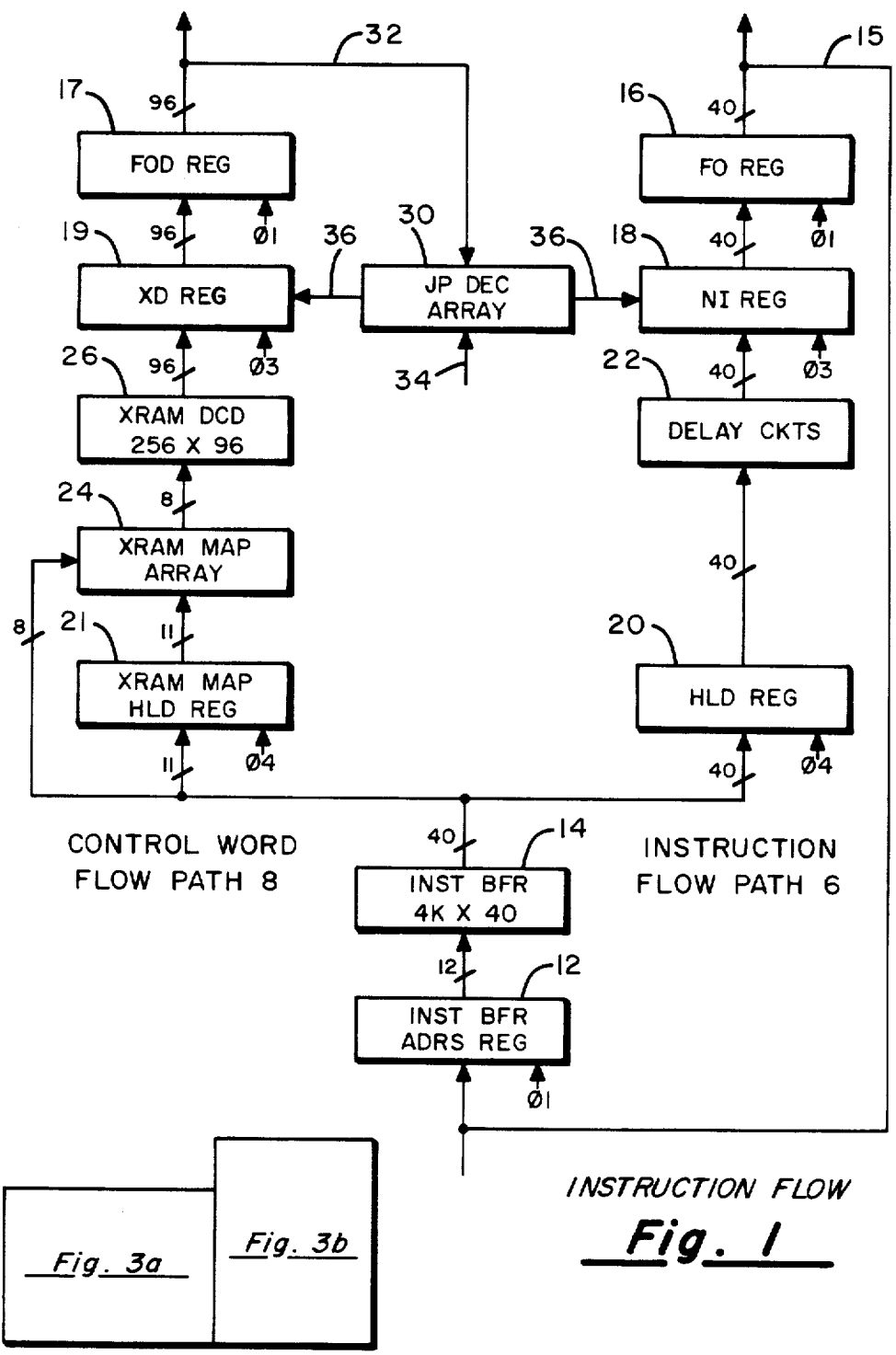
Figure 2:
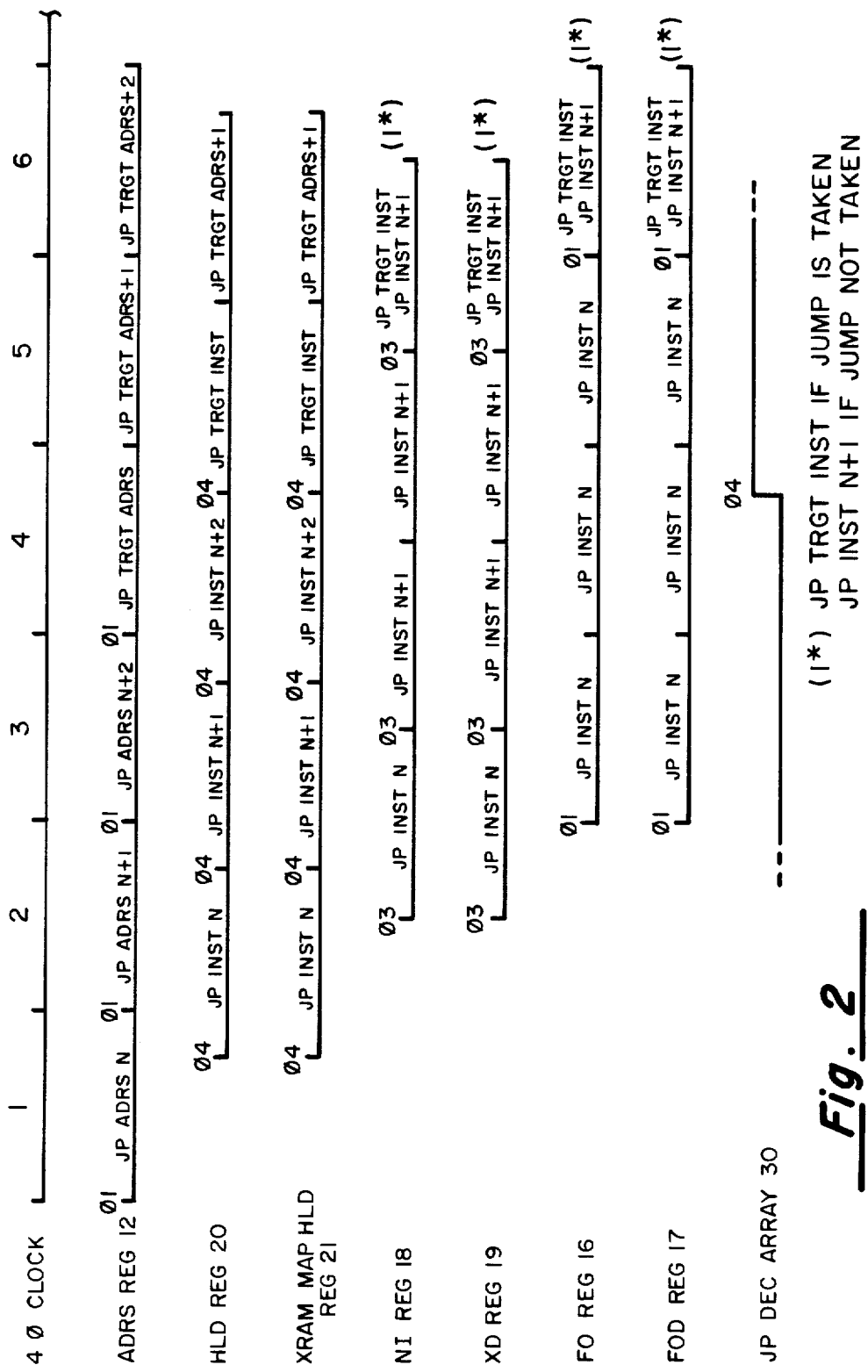
FIG. 2 is an illustration of a timing diagram of the flow of the instructions and control words through the block diagram of FIG. 1.
Figure 3A:
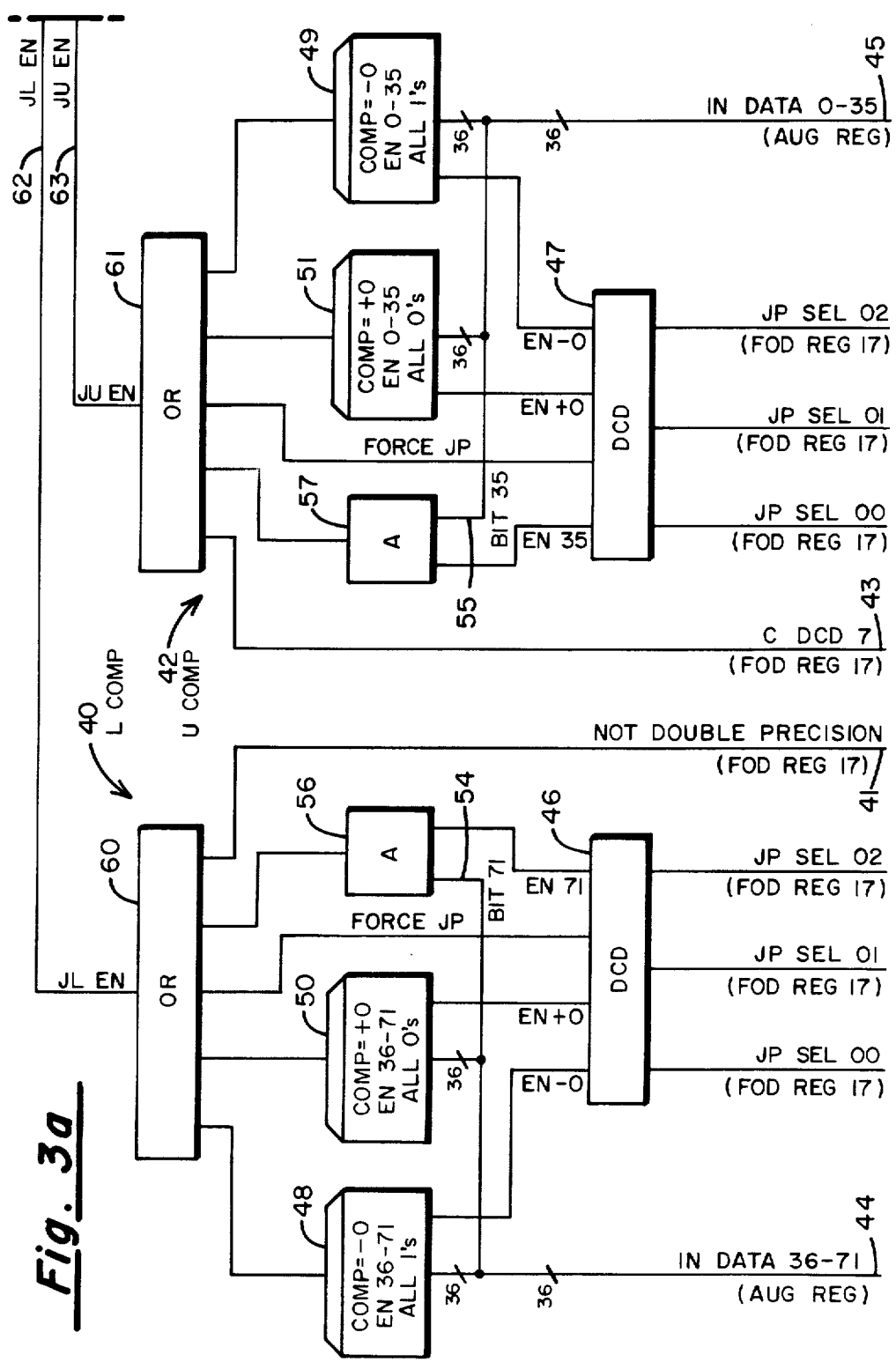

With particular reference to FIGS. 1 and 2 there are presented a block diagram and a timing diagram of the instruction flow of the instructions and control words of the scientific processor into which the present invention is incorporated. Such scientific processor and instruction flow are more fully disclosed in the copending patent application of Louis B. Bushard, et al. Ser. No. 696,130, now U.S. Pat. No. 4,680,775 having a filing date of July 29, 1985 and entitled A Scientific Processor, with particular reference to pages 79, 80 and 125 through 158 and FIGS. 10G and 18 through 51, the teachings of which are incorporated herein by reference.

In the present invention, an address register 12 couples, at a fixed clock rate, a consecutive series of instruction addresses to an instruction buffer 14, which is caused to output a series of corresponding instructions N, N+1, N+2, etc. at the fixed clock rate. The instructions are, in turn, coupled, in a pipelined fashion, to two parallel flow paths, an instruction flow path 6 and a control word flow path 8. The instructions and their related control words flow, in parallel, through their respective flow paths at the fixed clock rate. Such instructions N, N+1, N+2 are normally temporarily held in function (FO) register 16, instruction (NI) register 18 and holding (HLD) register 20, respectively, while their related control words are normally temporarily held in function (FOD) register 17, instruction (XD) register 19 and holding (XRAM MAP HLD) register 21. When each instruction and its related control word are resident in their corresponding FO register 16 and FOD register 17, respectively, the instruction is issued to the scientific processor system and is executed.

If instruction N is a jump instruction, the instruction flow is halted and jump instruction N, from FO register 16, causes address register 12 to couple the address of the jump target instruction, i.e., instruction Y of jump instruction N, to instruction buffer 14. Instruction buffer 14 then couples the jump target instruction of jump instruction N to the parallelly coupled instruction flow path 6 and control word flow path 8. The jump target instruction and related control word are loaded into and written, or laid, over the instruction N+2 respective instruction and control word held in their respective HLD register 20 and XRAM MAP HLD register 21. The halting of the instruction flow holds the instructions and control words in their associated registers while jump decision circuitry determines if the jump conditions have or have not been satisfied.

If the jump conditions are satisfied, the jump target instruction and related control word are loaded into and written, or laid, over the instruction N+1 and related control word held in their respective instruction registers NI register 18 and XD register 19. If the jump conditions are not satisfied, the status of the instruction registers NI register 18 and XD register 19 is not altered. The instruction flow is again activated at the fixed clock rate to couple either the jump target instruction of the jump instruction N, if the jump conditions are satisfied, or, alternatively, the instruction N+1 instruction and related control word, if the jump conditions are not satisfied, to their respectively associated function registers FO register 16 and FOD register 17 to be executed by the scientific processor system.

In the instruction flow block diagram of FIG. 1, FO register 16, NI register 18 and HLD register 20 are 40-bit registers for holding the 40-bit instructions provided by instruction buffer 14 while delay circuit 22 is representative of instruction flow path 6 delays provided by intermediate circuitry. XRAM MAP HLD register 21 holds an 11-bit code portion of the instruction held in HLD register 20. XRAM MAP ARRAY 24 is a translate RAM, which in response to the 11-bit code portion from XRAM MAP HLD register 21 and an 8-bit code portion from the instruction held in HLD register 20, provides, as an output, an 8-bit address to XRAM DCD 26. XRAM DCD 26 is a 256×96-bit RAM, which outputs a 96-bit control word that is related to the instruction held in HLD register 20. Instruction buffer 14 is representative of four 1K 40-bit instruction buffers in which 4K 40-bit instructions are stored. Instruction buffer address register 12 is representative of the addressing mechanism whereby the 40-bit instructions that are stored in instruction buffer 14 are addressed and coupled to instruction flow path 6 and control word path 8. All such components are more fully described in the hereinabove referenced L. B. Bushard, et al patent application. The present invention includes the JP DEC ARRAY 30, as will be discussed in greater detail with particular reference to FIG. 3.

FIG. 2 is an illustration of a timing diagram illustrating the clocked flow of the instructions issued by instruction buffer 14 as they flow through instruction flow path 6 and control word flow path 8 as illustrated in FIG. 1. Initially it can be seen that the instruction and control word flow paths 6 and 8, respectively, are clocked by a four phase (4φ) clock cycle, each of the four phases being of 7.5 nanoseconds (ns) in duration so that each clock cycle is 30 ns in duration. As illustrated in FIG. 2, at clock cycle 1, φ1, address register 12 couples jump address N to instruction buffer 14. Please note that as illustrated in FIG. 2 consecutive addresses are coupled by address register 12 to instruction buffer 14 at consecutive clock cycles such that at clock cycle 2 φ1 address register 12 couples jump address N+1 to instruction buffer 14, at clock cycle 3 φ1 address register 12 couples jump address N+2 to instruction buffer 14, etc.

At clock cycle 1 φ1, when address register 12 couples the address of JP INST N to instruction buffer 14, instruction buffer 14 outputs JP INST N, which is, in turn, coupled to HLD register 20 of instruction flow path 6. Additionally an 11-bit code portion and an 8-bit code portion of JP INST N are coupled to HLD register 21 and XRAM MAP ARRAY 24, respectively, of control word flow path 8. Next at clock cycle 1 φ4, HLD register 20 is enabled to cause JP INST N to be written into HLD register 20 while concurrently HLD register 21 is enabled to couple the 11-bit code portion of JP INST N to XRAM MAP ARRAY 24 which, along with the 8-bit code portion of JP INST N, causes XRAM MAP ARRAY 24 to couple an 8-bit address to XRAM DCD 26 which, in turn, couples a 96-bit control word, related to JP INST N, to XD register 19. At this time than, prior to clock cycle 2 φ3, NI register 18 is loaded with the 40-bit JP INST N and XD register 19 is loaded with the 96-bit control word related to JP INST N.

At clock cycle 2 φ1, when address register 12 couples the address of JP INST N+1 to instruction buffer 14, instruction buffer 14 couples JP INST N+1, which is, in turn, coupled to HLD register 20 and an 11-bit code portion and an 8-bit code portion of JP INST N+1 are coupled to HLD register 21 and XRAM MAP ARRAY 24.

Next at clock cycle 2 φ3, NI register 18 is enabled to cause JP INST N in HLD register 20 to be coupled to and written into NI register 18 while, concurrently, XD register 19 is enabled to cause the corresponding 96-bit control word in XRAM DCD 26 to be written into XD FOD register 19.

Next at clock cycle 2 φ4, HLD register 20 is enabled to cause JP INST N+1, which is coupled thereto by instruction buffer 14, to be written into HLD register 20 while, concurrently, XRAM MAP HLD register 21 is enabled whereby an 11-bit code portion of JP INST N+1 is coupled to and written in XRAM MAP HLD register 21.

Next at clock cycle 3 φ1, address register 12 couples the address of JP INST N+2 to instruction buffer 14 causing instruction buffer 14 to output JP INST N+2, which is, in turn, coupled to HLD register 20, while, concurrently, an 11-bit code portion and an 8-bit code portion of JP INST N+2 are coupled to XRAM MAP HLD register 21 and XRAM MAP ARRAY 24, respectively. At the same time, FO register 16 is enabled to cause JP INST N held in NI register 18 to be coupled to and written into FO register 16 and FOD register 17 is enable to cause the 96-bit control word, which is held in XD register 19 and that is related to the JP INST N that was held in NI register 18, to be coupled to and written into FOD register 17. Additionally, when JP INST N is stored in FO register 16, it, via cable 15, enables address register 12 to select and then couple, as at clock cycle 4 $\phi$1, the JP TRGT ADRS, rather than the JP ADRS N+3, to instruction buffer 14. At this time then, at clock cycle 3 $\phi$1, JP INST N and its related 96-bit control word are held in FO register 16 and FOD register 17, respectively, and the JP INST N is issued to the system to be executed by the scientific processor system.

Next at clock cycle 3 $\phi$3, NI register 18 is enabled to cause JP INST N+1 in HLD register 20 to be coupled to and written into NI register 18 while, concurrently, XD register 19 is enabled to cause the corresponding 96-bit control word in XRAM DCD 26 to be coupled to and written into XD register 19.

Next at clock cycle 3$\phi$4, HLD register 20 is enabled to cause JP INST N+2, which is coupled thereto by instruction buffer 14, to be written into HLD register 20 while, concurrently, XRAM MAP HLD register 21 is enabled whereby and 11-bit code portion of JP INST N+2 is coupled to and written in XRAM MAP HLD register 21.

Next at clock cycle 4 $\phi$1, address register 12 couples the address of the JP TRGT INST of JP INST N to instruction buffer 14 causing instruction buffer 14 to output the JP TRGT INST, which is, in turn, coupled to HLD register 20, while, concurrently, an 11-bit code portion and an 8-bit code portion of JP TRGT INST are coupled to XRAM MAP HLD register 21 and XRAM MAP ARRAY 24, respectively.

At this time, FO register 16 is not enabled whereby the JP INST N is retained in FO register 16 and FOD register 17 is also not enabled whereby the control word which is held in FOD register 17 and that is related to the JP INST N held in FO register 16 is retained in FOD register 17. At this time then, at clock cycle 4 $\phi$1 with the JP INST N and its related control word retained in FO register 16 and FOD register 17, respectively, the JP INST N is continued to be issued to the system to be executed by the instruction processor system.

Next at clock cycle 4 $\phi$3, NI register 18 is not enable whereby the JP INST N+1 is retained in NI register 18 while, concurrently, XD register 19 is also not enabled whereby the corresponding 96-bit control word is retained in XD register 19.

At approximately the same time, e.g., clock cycle 4 $\phi$4, the JP DEC ARRAY 30, in response to the signals coupled thereto from FOD register 17, via cable 32, and from the associated scientific processor system, via cable 34, has determined that the jump conditions of JP INST N have been satisfied and couples an enabling signal, via line 36, to both NI register 18 and XD register 19 whereby the JP TRGT INST and related control word will be enabled to be written, or laid over the JP INST N+1 and related control word held in NI register 18 and XD register 19, respectively, at clock cycle 5 $\phi$3.

Next at clock cycle 4 $\phi$4, HLD register 20 is enabled to cause the JP TRGT INST, which is coupled thereto by instruction buffer 14, to be written into HLD register 20 while, concurrently, XRAM MAP HLD register 21 is enabled whereby an 11-bit code portion of the JP TRGT INST is written in XRAM MAP HLD register 21.

Next at clock cycle 5 $\phi$1, address register 12 couples the address of the JP TRGT INST+1 to instruction buffer 14 causing instruction buffer 14 to output JP TRGT INST+1, which is, in turn, coupled to HLD register 20, while, concurrently, an 11-bit code portion and an 8-bit code portion of JP TRGT INST+1 are coupled to XRAM MAP HLD register 21 and XRAM MAP ARRAY 24, respectively.

At this time, FO register 16 is again not enabled whereby the JP INST N is retained in FO register 16 and FOD register 17 is also again not enabled whereby the control word that is held in FOD register 17 and that is related to the JP INST N held in FO register 16 is retained in FOD register 17. At this time then, at clock cycle 5 $\phi$1, with the JP INST N and its related control word retained in FO register 16 and FOD register 17, respectively, the JP INST N is continued to be issued to the system to be executed by the instruction processor system.

Next at clock cycle 5 $\phi$3, NI register 18 is enabled by JP DEC ARRAY 30 to cause the JP TRGT INST in HLD register 20 to be coupled to and written into NI register 18 while concurrently, XD register 19 is enabled by JP DEC ARRAY 30 to cause the corresponding 96-bit control word in XRAM DCD 26 to be written into XD register 19.

Next at clock cycle 5 $\phi$4, HLD register 20 is enabled to cause JP TRGT INST+1, which is coupled thereto by instruction buffer 14, to be written into HLD register 20, while, concurrently, XRAM MAP HLD register 21 is enabled whereby an 11-bit code portion of JP TRGT INST+1 is coupled to and written in XRAM MAP HLD register 21.

Next at clock cycle 6$\phi$1, address register 12 couples the address of JP TRGT INST+2 to instruction buffer 14 to output JP TRGT INST+2, which is, in turn, coupled to HLD register 20, while, concurrently, an 11-bit code portion and an 8-bit code portion of JP TRGT INST+2 are coupled to XRAM MAP HLD register 21 and XRAM MAP ARRAY 24, respectively. At the same time, FO register 16 is enabled to cause the JP TRGT INST held in NI register 18 to be coupled to and written into FO register 16 and FOD register 17 is enabled to cause the 96-bit control word, which is held in XD register 19 and that is related to the JP TRGT INST that was held in NI register 18, to be coupled to and written into FO register 17. At this time then, at clock cycle 6 $\phi$1, the JP TRGT INST and its related 96-bit control word are held in FO register 16 and FOD register 17, respectively, and the JP TRGT INST is issued to the system to be executed by the instruction processor system.

It is of course quite apparent that if JP DEC ARRAY 30 had determined that the jump conditions of the JP INST N had not been satisfied, the JP TRGT INST and its related 96-bit control word would not have been written into FO register 16 and FOD register 17, respectively but that the JP INST N+1 and the related 96-bit control word would have been entered into FO register 16 and FOD register, respectively to be issued to the system to be executed by the scientific processor system.

With particular reference to FIG. 3, there is presented an illustration of a block diagram of the JP DEC ARRAY 30 of FIG. 1. As noted hereinabove, JP DEC ARRAY 30, in response to signals, via cable 32, from the 96-bit control word in FOD register 17 and control signals, via cable 34, from the scientific processor system into which it is incorporated, determines whether or not the jump conditions stipulated by JP INST N have been satisfied. If such jump conditions have been ciated OR Gate (OR) 60 and 61, respectively, to couple an enabling Hi JL EN or JU EN signal to their respective output lines 62 and 63, respectively. Further forcing signals, if Hi, such as a NOT DOUBLE PRECISION signal on line 42 and a C DCD7 signal on line 43, both from FOD register 17, may be employed to force OR 60 and 61 to couple enabling Hi JL EN and JU EN signals to their respective output lines 62 and 63, respectively.

TABLE A

TRUTH TABLE DCD 46, 47

| OUTPUTS FROM DCD 46, 47 | ACTIVE OUTPUTS | INPUTS TO DCD 46, 47 | | | Hi ACTIVE |
|---|---|---|---|---|---|
| | | JP SEL 00 | JP SEL 01 | JP SEL 02 | |
| EN − 0 | Hi | Lo | Lo | Hi | |
| | | Hi | Lo | Lo | |
| | | Lo | Hi | Hi | |
| EN + 0 | Hi | Lo | Hi | Lo | Lo |
| | | Hi | Hi | Lo | |
| | | Lo | Hi | Hi | INACTIVE |
| FORCE JP | Hi | Lo | Lo | Lo | |
| | | Hi | Lo | Hi | |
| EN 35, 71 | Hi | Hi | Hi | Hi | | satisfied, JP DEC ARRAY 30 couples an enabling signal, via line 36, to both NI register 18 and XD register 19 whereby the JP TRGT INST and related control word will be enabled to be written, or laid over the JP INST N+1 and the related control word held in NI register 18 and XD register 19, respectively, at clock cycle 5 φ3, all as discussed hereinabove.

JP DEC ARRAY 30 utilizes the 72-bit data word held in the augend register of the associated scientific processor system to assist in the determination of whether or not the jump conditions of the JP TRGT INST have been satisfied. The 72-bit data word is segmented into an upper segment, of the higher ordered bits 0–35, and a lower segment of the lower ordered bits 36–71. The 36-bit lower segment and the 36-bit upper segment are coupled, via cable 44 and cable 45, respectively, to separately associated lower comparator circuits (COMP) 48, 50 and to separately associated upper comparator circuits (COMP) 49, 51, respectively, all of which are substantially identical in logic construction. DCD 46 and DCD 47, in response to the noted input signals, decode such input signals and provide decoded output signals in accordance with truth Table A.

The decoded output signals EN−0 and EN+0 from DCD 46, if Hi, enable −0 comparator (−0 COMP) 48 and the +0 comparator (+0 COMP) 50 and from DCD 47 enable −0 COMP 49 and +0 COMP 51, respectively, to compare the 36-bit lower segment and the 36-bit upper segment, respectively, of the 72-bit data word lower and upper segments on cables 44 and 45, respectively, to all 1's and all 0's, respectively, and to provide an enabling high signal on their respective output lines if a match occurs. Additionally, the decoded output signals EN 71 from DCD 46 and EN 35 from DCD 47, if Hi, along with bit 71 and bit 35, respectively, if Hi, of the 36-bit data word lower and upper segments on lines 54 and 55, respectively, enable AND gates (A) 56 and 57, respectively to provide an enabling Hi signal on their respective output lines. Any one of these output signals or the decoded output FORCE EN signal, from DCD 46 and 48, if Hi, will enable the asso- JL EN and JU EN signals on lines 62 and 63, respectively, are, in turn, coupled to logic array (EI ARRAY) 66 to be combined with K0 EN and K1 EN signals on lines 68 and 69, respectively from dual one of eight selectros (DUL SEL)70. DUAL SEL 70 solves the noted logic equations to provide a Lo EI signal on its output line 67 if the conditions of the logic equation are satisfied.

DUAL SEL 70, under address control of the 3-bit selection signals on line 72, 73, 74, selects one like-ordered bit from both K0 bits 0–7 and K1 bits 0–7 and outputs these 2 bits as the Hi or Lo K0 EN and K1 EN signals on output lines 68 and 69, respectively. The 3-bit selection signals on lines 72, 73, 74 are preferrably coded in conventional octal coding. As an example if the signals on lines 72, 73, 74, with the signal on line 72 being the highest ordered bit, are 0, 1, 1 (Lo, Hi, Hi) this would be decoded as a decimal 3. Thus, K0 EN signal on line 68 would be determined by the level, Hi or Lo, of the XOR JC Bit signal on line 76 and the K1 EN signal would be determined by the level of the JP CTRL K1 signal on line 78.

EI ARRAY 66 operates upon the input signals coupled thereto on lines 62, 63, 68, 69 to provide an output EI signal on line 67, which is, in turn, coupled as a first input signal to A 80. If EI signal on line 67 is Lo, A 80 is, in turn, enabled by a Lo JP TIMING CHAIN signal on line 82 to couple, via line 88 a Lo signal to enable AND (EN AND) 90. Only when all of the signals on lines 84, 85, 86 are Lo is EN AND 90 enabled to couple to output line 36 a Hi signal indicating that the jump criteria of the jump instruction JP INST N have been satisified. Such Hi EN AND 90 output signal, when coupled to NI register 18 and XD register 19, via line 36, enables the JP TRGT INST instruction and related control word to be written in or laid over, the JP INST N+1 instruction and related control word in NI register 18 and XD register 19, all this as discussed hereinable with particular reference to the discussions of FIG. 2.

In consideration of the above discussion and drawings it is apparent that applicants have disclosed herein a novel method of an apparatus for inserting a jump target instruction in the instruction flow path of a scientific processor system.

What is claimed is:

1. A method of inserting a jump target instruction with a control word portion in an instruction flow path of an instruction processing system, comprising the steps of:
    forming an instruction flow path of serially aligned first and second register means;
    forming, in parallel to said instruction flow path, a control word path of corresponding serially aligned first and second register means;
    commonly coupling a jump instruction N and an instruction N+1, each having a control word portion to said instruction flow path and to said control word path whereby said jump instruction N and said instruction N+1 are stored in said first and second register means of said instruction flow path while said control word portions are correspondingly coupled in said first and second register means of said control word path respectively;
    coupling the jump target instruction of said jump instruction N to the second register means of said instruction flow path and the control word portion of said jump instruction to the second register means of said control word path;
    determining that the jump conditions for said jump instruction N have been satisfied;
    concurrently writing said jump target instruction and its corresponding control word portion over the instruction N+1 and its N+1 control word portion presently contained in said corresponding second register means of said instruction flow path and of said control word path; and then
    transferring said jump target instruction and its corresponding control word portion to said first register means of said instruction word path and of said control word path respectively for enabling said jump target instruction to be executed.

2. A method of inserting a jump target instruction with a control word portion in an instruction flow path of an instruction processing system, comprising the steps of:
    forming an instruction flow path of serially aligned holding register means, instruction register means and function register means;
    forming, in parallel to said instruction flow path, a control word flow path of corresponding serially aligned holding register means, instruction register means and function register means;
    commonly coupling a serial plurality of instructions including a jump instruction N, having a jump target instruction included therein, and instructions N+1 and N+2, each of which includes a control word portion to said instruction flow path and to said control word flow path whereby said jump instruction N, and said instructions N+1 and N+2 are stored in said function register means, said instruction register means, and said holding register means of said instruction flow path while said corresponding control word portions are stored in said function register means, said instruction register means and said holding register means of said control word flow path, respectively;
    coupling the jump target instruction of said jump instruction N to said instruction flow path and the control word portion of jump target instruction to said control word flow path;
    writing said jump target instruction over said instruction N+2 in said holding register means of said instruction flow path and also writing the control word portion of the jump target instruction over said control word portion of said instruction N+2 in said holding register means of said control word flow path;
    determining that the jump conditions for said jump instruction N have been satisfied; and
    writing said jump target instruction in said function register means of said instruction flow path and said control word of said jump target instruction in said control word flow path for enabling said jump target instruction to be executed.

3. A method of inserting a jump target instruction in an instruction flow path of an instruction processing system, comprising:
    forming an instruction flow path of serially aligned holding register means, instruction register means and function register means;
    forming a control word flow path of serially aligned holding register means, RAM decoder means, instruction register means, and function register means;
    coupling in parallel said instruction flow path and said control word flow path at their respective holding registers.
    serially coupling a jump instruction N and instructions N+1 and N+2 at a fixed clock rate to said coupled in parallel instruction flow path and said control word flow path for enabling said jump instruction N and instructions N+1 and N+2 to be written into the function register means, the instruction register means and the holding register means, respectively, of said instruction flow path and for enabling the corresponding control words to be written into the function register means, the instruction register means and the holding register means of said control word flow path;
    coupling the jump target instruction of said jump instruction to said coupled in parallel instruction flow path and said control word flow path for enabling said jump target instruction to be written over said instruction N+2 in said instruction flow path holding register means and for enabling the corresponding control word of said jump target instruction to be written over the corresponding control word of said instruction N+2 in said control word flow path holding register means;
    determining that the jump conditions for said jump instruction N have been satisfied;
    enabling the jump target instruction of said jump instruction N as stored in said instruction flow path holding register means to be written over the instruction N+1 in said instruction flow path instruction register means;
    enabling the corresponding control word of said jump instruction N as stored in said control word flow path holding register means to be written over the corresponding control word of said instruction N+1 in said control word flow path instruction register means; and enabling the jump target instruction of said jump instruction N as stored in said instruction flow path instruction register means to be written in said instruction flow path function register means; and enabling the corresponding control word of the jump target instruction of said instruction N as stored in said control word flow path instruction register means to be written in said control word flow path function register means;

said jump target instruction and said corresponding control word when in their corresponding function register means enabling said jump target instruction to be executed.

4. An apparatus for inserting a jump target instruction with a control word portion in an instruction flow path of an instruction processing system, comprising:

an instruction flow path comprised of serially aligned first and second register means;

a control word flow path connected in parallel with said instruction flow path comprised of corresponding serially aligned first and second register means;

instruction buffer means for coupling a conditional jump instruction N and an instruction N+1 both of which include a control word portion to said instruction flow path whereby said conditional jump instruction N and said instruction N+1 are stored in said first and second register means of said instruction flow path, respectively and for coupling the control word portions to the control word flow path whereby said control word portions of said conditional jump instruction N and said instruction N+1 are stored in said first and second register means of said control word flow path respectfully;

said instruction buffer means coupling the jump target instruction of said conditional jump instruction N to said second register means of said instruction flow path and also coupling the control word portion of said jump target instruction to said second register means of said control word flow path;

jump decision means for determining that the jump conditions for said conditional jump instruction N have been satisfied;

said second register means of said instruction flow path and said second register means of said control word flow path both responsively coupled to said jump decision means for enabling said jump target instruction to be written into said second register means of said instruction flow path while its control word portion is written into said second register means of said control word flow path when said jump conditions have been satisfied; and said second register means of said instruction flow path coupling said jump target instruction to said first register means of said instruction flow path for writing said jump target instruction therein while said second register means of said control word flow path couples the control word portion of said jump target instruction to said first register means of said control word flow path for writing therein and for enabling said jump target instruction to be executed.

5. An apparatus for inserting a jump target instruction having a control word portion in an instruction flow path of an instruction processing system, comprising:

an instruction flow path comprised of serially aligned holding register means, instruction register means and function register means;

a control word flow path, connected in parallel to said instruction flow path, and correspondingly comprised of serially aligned holding register means, instruction register means and function register means;

instruction buffer means for serially coupling a conditional jump instruction N and instructions N+1 and N+2 concurrently to said instruction flow path and to said control word flow path in a pipelined method whereby said conditional jump instruction N and said instructions N+1 and N+2 are stored in said function register means, said instruction register means and said holding register means of said instruction flow path, respectively and said control word portions of said conditional jump instruction N, and said instructions N+1 and N+2 are stored in said function register means, said instruction register means and said holding register means of said control word flow path, respectfully;

said instruction buffer means coupling the jump target instruction of said conditional jump instruction N to said instruction flow path for writing said jump target instruction over said instruction N+2 in said holding register means;

jump decision means for determining that the jump conditions for said conditional jump instruction N have been satisfied;

said holding register means of said instruction flow path coupling the jump target instruction of said conditional jump instruction N to said instruction register means;

said instruction register means of the instruction flow path responsively coupled to said jump decision means for writing said jump target instruction over said instruction N+1 therein when said jump conditions have been satisfied; and in said instruction flow path said instruction register means coupling the jump target instruction of said conditional jump instruction N to said function register means for writing said jump target instruction in said function register means and enabling said jump target instruction to be executed.

6. An apparatus for inserting a jump target instruction in an instruction flow path of an instruction processing system, comprising:

an instruction flow path comprised of serially aligned HLD register means, NI register means and FO register means;

a control word flow path comprised of serially aligned XRAM MAP HLD register means, XRAM MAP ARRY means, XRAM decoder means, XD register means, and FOD register means;

means for coupling in parallel said instruction flow path and said control word flow path at their respective HLD and XRAM MAP HLD registers;

instruction buffer means for serially coupling a conditional jump instruction N and instructions N+1 and N+2 at a fixed clock rate to said coupled in parallel instruction flow path and said control word flow path for enabling said conditional jump instruction N and instructions N+1 and N+2 to be written into the FO register means, the NI register means and the HLD register means, respectively, of said instruction flow path and for enabling the corresponding control words to be written into the FOD register means, the XD register means and the XRAM MAP HLD register means of said control word flow path;

said instruction buffer means coupling the jump target instruction of said conditional jump instruction N to said coupled in parallel instruction flow path and said control word flow path for enabling said jump target instruction to be written over said instruction N+2 in said HLD register means and for enabling the corresponding control word of said jump target instruction to be written over the corresponding control word of said instruction N+2 in said XRAM MAP HLD register means;

jump decision means for determining that the jump conditions for said conditional jump instruction N have been satisfied;

said HLD register means enabling the jump target instruction of said jump instruction N as stored in said HLD register means to be written over the instruction N+1 in said NI register means;

said XRAM MAP HLD register means enabling, via said XRAM MAP ARRAY means and said XRAM DCD means, the corresponding control word of said conditional jump instruction N as stored in said HLD register means to be written over the corresponding control word of said instruction N+1 in said XD register means;

said NI register means responsively coupled to said jump decision means for enabling the jump target instruction of said conditional jump instruction N, as stored in said NI register means, to be written in said UI register means and then in said FO register means only when said jump conditions have been satisfied;

said XD register means responsively coupled to said jump decision means for enabling the corresponding control word of the jump target instruction of said instruction N, as stored in said XD register means, to be written in said XD register means and then in said FOD register means only when said jump conditions have been satisfied;

said jump target instruction and said corresponding control word when in their corresponding FO and FOD register means enabling said jump target instruction to be executed.

* * * * *